Aug. 26, 1969  J. SZAVA ET AL  3,463,799
DIMETHYLAMINO-BIS(2-HYDROXYPHENYL) SULFONIC AND CARBOXYLIC
ACID AND METAL CHELATES THEREOF
Filed June 19, 1967
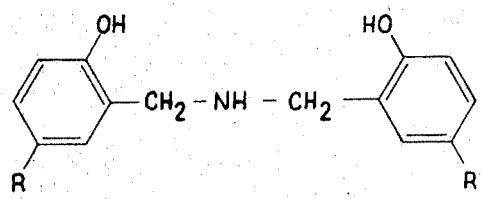
(I)
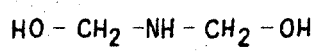
(II)
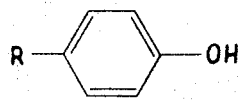
(III)
JENO SZÁVA
MAGDOLNA SÁROSI
ROSA TÖTÖS
INVENTORS
BY *Young & Thompson*
ATTYS

United States Patent Office 3,463,799
Patented Aug. 26, 1969

3,463,799
DIMETHYLAMINO - BIS - (2 - HYDROXYPHENYL) SULFONIC AND CARBOXYLIC ACID AND METAL CHELATES THEREOF
Jeno Szava, Magdolna Sarosi, and Rosa Totos, Budapest, Hungary, assignors to Chemolimpex Magyar Vegyiaru Kulkereskedelmi Vallalat, Budapest, Hungary
Filed June 19, 1967, Ser. No. 646,957
Int. Cl. C07f 15/02; C07c 101/72; A01n 5/00
U.S. Cl. 260—429  2 Claims

ABSTRACT OF THE DISCLOSURE

Compounds of the general formula

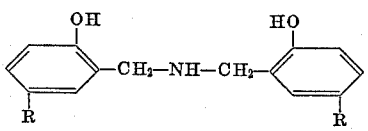

wherein R is selected from the group consisting of carboxylic and sulfonic acid residues in free and in salt form, and the heavy metal complexes thereof, posses valuable properties in treating trace element deficiency disease of plants.

---

The invention relates to novel organic chelating compounds, i.e. compounds forming stable organic chelates with heavy metals, and the heavy metal chelates thereof suitable for treating trace element deficiency disease of plants (iron chlorosis).

It is known that the open chain diamine compounds show chelate forming properties; the most known compound of this kind is the ethylenediamine tetraacteic acid (EDTA) which is widely used both for analytical and industrial or agricultural purposes. The iron chelate of EDTA was advised to be employed against the iron chlorosis of plants. The great disadvantage of these compounds is that they are not effective when added to alkaline, limy soil; and their application in the form of spray is also unsuitable, as they can cause burning sysmptoms on the leaves and crops of the plants.

Better results were obtained by differently substituted bis-phenyl-ethylenediamine diacetic acid derivates described in the Swiss patent specifications No. 352,688 and 353,747—but these are rather complicated compounds and their preparation is relatively elaborate and expensive.

In the figures, I is a representation of the compounds of the invention, FIGURE II represents dimethylol amine used as an intermediate and FIGURE III represents para-substituted phenols which are reacted with the dimethylol amine in order to form the compounds of FIGURE I.

It has been found that the compounds of the general Formula I wherein R is carboxylic or sulfonic acid group (possibly converted into salt) are stable and effective for agricultural and horicultural uses.

R must be in the para-position to the hydroxyl group on the phenyl ring. The physical properties, as the solubility of the obtained chelating compounds and of their heavy metal chelates can be influenced by the selection of the R group; the best solubility in water show the compounds of general Formula I having a —$SO_3H$ group as R substituent from which alkali or ammonium salt can be formed.

The novel organic chelating compounds of general Formula I are prepared according to the present invention by reacting ammonia with two molar equivalents of formaldehyde to yield the corresponding dimethylol derivate of the formula HO—$CH_2$—NH—$CH_2$—OH II and reacting the latter with two molar equivalents of a para substituted phenol of the general Formula III.

The above reactions can be carried out in an aqueous medium. The end product of the general Formula I can be separated in a simple way; in case of soluble compounds, e.g. the alkali sulfonate derivates (R=$SO_3Na$) the product can be separated by evaporating the reaction mixture.

The heavy metal complexes of the compounds of general Formula I can be prepared in aqueous solution too by reacting the chelate forming compound of general Formula I with the calculated amount of a heavy metal salt, e.g. of iron (III)—chloride. The recovery of the water soluble products can be carried out by evaporating the reaction mixture or by adding to it a water miscible organic solvent which does not dissolve the chelate, e.g. acetone or ethanol.

The heavy metal chelates of the general Formula I prepared by the method of the invention are stable against acids and bases and can be applied with good results and without danger for curing the iron chlorosis and other trace element deficiency disease of plants not only by spraying but also by adding them in the soil and in this application they maintain their effectivity in alkaline, limy soils too.

The following examples further demonstrate the process of the invention.

EXAMPLE 1. — PREPARATION OF DIMETHYL-AMINO-BIS-2 - HYDROXYPHENYL-5 - SODIUM SULFONATE

Into a 500 ml. flask provided with a reflux condenser and with stirrer is transferred 28 parts of 25% ammonium-hydroxide. 30 parts of 40% formaldehyde solution are added in 10–15 minutes under constant stirring at 25–30° C. The temperature of the solution rises during this addition.

79 parts of sodium p-phenolsulfonate are then dissolved in 100 parts of water, the phenolsulfonate solution is neutralized with 50% NaOH solution and the solution thus obtained is added to the above reaction mixture within 30 minutes. The obtained homogenous reaction mixture is then heated to boiling and is refluxed for 8 hours under constant stirring. After 8 hours the dimethylamino-bis-2-hydroxyphenyl-5-sodium sulfonate is recovered by evaporating the solution. Instead of evaporation of the solution the product can be recovered also by pouring the solution into 1500 ml. of acetone. The end product which is slightly soluble in water precipitates in the form of a yellowish crystal mass. It is then filtered, washed with acetone and dried. The yield is the 90–92% of the theoretical amount.

EXAMPLE 2—PREPARATION OF METAL CHELATES

Heavy metal chelates can be prepared in the following way from the chelate forming compounds obtained according to the process of the above examples.

(a) Diemethylamino-bis-2-hydroxyphenyl-5-sodium sulfonate chelate 435 parts of a chelating compound prepared according to Example 1 is dissolved in 500 parts of water of the temperature 40° C., 320 parts of 50% iron (III) chloride is then added while constant stirring. Purple coloured solution is formed, the iron chelate is recovered by evaporating to dryness.

(b) Preparation of other iron chelates

Cobalt, nickel or manganese chelates can be prepared by the same method, replacing the iron(III) chloride by an aqueous solution of the equivalent amount of a cobalt, nickel or manganese salt. This solution is added to the aqueous solution of the chelating compound.

What we claim is:
1. Compounds of the formula

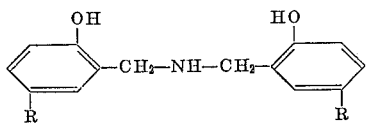

wherein R is selected from the group consisting of carboxylic and sulfonic acid residues in free and in salt form.
2. The heavy metal complexes of the chelating compounds of claim 1.

References Cited

UNITED STATES PATENTS 2,458,527  7/1945  Oberright _____ 252—33.6
3,219,700  11/1965 O'Shea et al. _____ 260—567
3,389,172  6/1968  Burows et al. _____ 260—510

OTHER REFERENCES

Duff et al.: J. Chem. Soc., 1951, pp. 1512–4.
Frost et al.: J. Am. Chem. Soc., vol. 80 (1958), pp. 531 and 535.
Muto: Chem. Abst., vol. 48, columns 5828–9, Abstract of J. Chem. Soc., Japan, Pure Chem. Sect., vol. 34, pp. 274–7.
Beretka et al.: Australian J. Chem., vol. 17 (1964), p. 201.

TOBIAS E. LEVOW, Primary Examiner

A. P. DEMERS Assistant Examiner

U.S. Cl. X.R.

71—1; 260—439, 509, 519, 584